US012595354B2

(12) United States Patent
Boonman et al.

(10) Patent No.: US 12,595,354 B2
(45) Date of Patent: Apr. 7, 2026

(54) METHOD FOR THE MANUFACTURE OF A POLYCARBONATE COMPOSITION

(71) Applicant: SABIC GLOBAL TECHNOLOGIES B.V., Bergen Op Zoom (NL)

(72) Inventors: Rob Boonman, Oosterhout (NL); Tamara Marijke Eggenhuisen, Raamsdonksveer (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 520 days.

(21) Appl. No.: 18/268,493

(22) PCT Filed: Dec. 7, 2021

(86) PCT No.: PCT/EP2021/084496

§ 371 (c)(1),
(2) Date: Jun. 20, 2023

(87) PCT Pub. No.: WO2022/135896

PCT Pub. Date: Jun. 30, 2022

(65) Prior Publication Data

US 2024/0052138 A1 Feb. 15, 2024

(30) Foreign Application Priority Data

Dec. 21, 2020 (EP) .................................... 20215890

(51) Int. Cl.
*C08K 5/526* (2006.01)
*C08K 5/42* (2006.01)

(52) U.S. Cl.
CPC ................ *C08K 5/526* (2013.01); *C08K 5/42* (2013.01); *C08K 2201/014* (2013.01)

(58) Field of Classification Search
CPC ................................. C08K 5/526; C08K 5/42
USPC ......................................................... 524/141
See application file for complete search history.

(56) References Cited

U.S. PATENT DOCUMENTS

2012/0202034 A1 8/2012 Morizur et al.
2016/0222191 A1 8/2016 Sharifi
2019/0284365 A1* 9/2019 Eggenhuisen ....... C08K 5/0041

FOREIGN PATENT DOCUMENTS

WO 9506651 A1 3/1995

OTHER PUBLICATIONS

International Search Report for International Application PCT/EP2021/084496, International Filing Date Dec. 7, 2021, Date of Mailing Mar. 14, 2022, 4 pages.
Written Opinion for International Application PCT/EP2021/084496, International Filing Date Dec. 7, 2021, Date of Mailing Mar. 14, 2022, 5 pages.

* cited by examiner

*Primary Examiner* — Deve V Hall
(74) *Attorney, Agent, or Firm* — CANTOR COLBURN LLP

(57) ABSTRACT

A method for the manufacture of a polycarbonate composition having a Yellowness Index of less than 2.0 is disclosed. The composition contains i) a polymer component including aromatic polycarbonate and ii) a bis(2,4-dicumylphenyl)pentaerythritol diphosphite component wherein the bis(2,4-dicumylphenyl)pentaerythritol diphosphite component consists of bis(2,4-dicumylphenyl)pentaerythritol diphosphite, contaminants and/or degradation products derived from bis(2,4-dicumylphenyl)pentaerythritol diphosphite.

13 Claims, No Drawings

METHOD FOR THE MANUFACTURE OF A POLYCARBONATE COMPOSITION

CROSS REFERENCE TO RELATED APPLICATIONS

This application is a National Stage application of PCT/EP2021/084496, filed Dec. 7, 2021, which claims the benefit of European Application No. 20215890.3, filed Dec. 21, 2020, both of which are incorporated by reference in their entirety herein.

BACKGROUND

The present invention relates to a method for the manufacture of a polycarbonate composition having a low yellowness index. More in particular the present invention relates to a method for the manufacture of a polycarbonate composition that has a low yellowness index when moulded under abusive conditions.

Polycarbonate is a well known amorphous polymer material combining excellent transparency and impact properties. Polycarbonate may be used as such or combined with other materials including in particular other polymeric or non-polymeric materials.

A disadvantage of polycarbonate is that it may develop an undesirable yellowish tint either directly after moulding or over time during use. Several solutions exist to reduce or mask the yellowing which include the use of colorants such as blue or blueish dyes or the use of additives like primary and/or secondary anti-oxidants. Primary antioxidants function essentially as free radical terminators or free radical scavengers while secondary antioxidants function essentially by retarding chain initiation by reacting with free radicals that are formed. Often the colorants and anti-oxidants are used in combination. A disadvantage of using additional colorants is that it adds cost to the composition but also reduces the overall material transparency.

Yellowing of polycarbonate becomes more pronounced when the polycarbonate is moulded at higher temperatures and/or higher residence times in the moulding equipment. At the same time such higher temperatures are more and more required in order to be able to manufacture more complex and/or thin-walled articles, where the complete filling of the mould requires a relatively low viscosity.

A commonly used secondary anti-oxidant for stabilising polycarbonate is bis(2,4-dicumylphenyl) pentaerythritol diphosphite referred to herein also as BPD. The typical amount of this material for stabilising polycarbonate is from about 0.01 to 0.1 wt. %. Below a value of 0.01 the effect of the anti-oxidant is insufficient while amounts over 0.1, although possible, may affect other properties such as hydrolytical stability.

WO 95/06651 discloses a diphosphite of formula

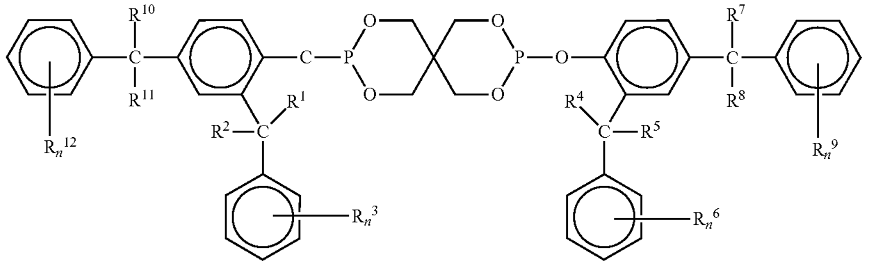

with improved resistance to hydrolysis and increased thermal stability and wherein $R^1$, $R^2$, $R^4$, $R^5$, $R^7$, $R^8$, $R^{10}$ and $R^{11}$ are selected independently from the group consisting of hydrogen and alkyl radicals of generic formula $C_mH_{2m+1}$ wherein m ranges from 1 to 4 and $R^3$, $R^6$, $R^9$ and $R^{12}$ are selected independently from the group consisting of hydrogen, halogens and alkyl radicals of generic formula $C_mH_{2m+1}$ wherein m ranges from 1 to 4, and further wherein n ranges from 0 to 3.

EP2853561 discloses a polycarbonate composition, comprising a polycarbonate polymer formed by a melt process; and a pentaerythritol diphosphite stabilizer; wherein the composition has a yellowness index (YI) of 3 or less when measured according to ASTM D1925 at 2.5 mm thickness; a light transmission of 90% or greater when measured according to ASTM D1003 at 2.5 mm thickness; a melt volume rate of 3 to 56 cc/10 min, when measured according to ASTM D1238; an endcap percentage of 65% to 90%; and a Fries content of from 200 ppm to 2750 ppm. The specific diphosphite stabiliser disclosed in this reference is bis(2,4-dicumyl) pentaerythritol diphosphite, which is similar to bis(2,4-dicumylphenyl) pentaerythritol diphosphite and marketed as Doverphos S-9228.

WO 2012/106425 discloses branched polycarbonate resin compositions that withstand discoloration and increased melt viscosity when exposed to elevated temperatures. This reference discloses compositions comprising bis(2,4-dicumylphenyl) pentaerythritol diphosphite as a heat stabiliser.

SUMMARY

The present application claims priority to European Patent Application No. 20215890.3. In that application reference was made to bis(2,4-dicumyl)pentaerythritol diphosphite as BPD rather than bis(2,4-dicumylphenyl) pentaerythritol. A skilled person will understand and appreciate however that the omission of “phenyl” was an obvious mistake and that within the context of the invention as disclosed herein the terms bis(2,4-dicumyl) pentaerythritol and bis(2,4-dicumylphenyl) pentaerythritol refer to the exact same chemical structure and accordingly the exact same material. Both these indications can therefore be used interchangeably throughout this specification without changing the scope of the disclosure or the appended claims.

Despite the fact that the BPD is used in a relatively low amount the present inventors have surprisingly found that if BPD is of insufficient purity the polycarbonate may nonetheless be prone to undesirable yellowing causing the YI to become too high.

More in particular the present inventors found that when the BPD is of insufficient purity the polycarbonate may be prone to undesirable yellowing when subjected to abusive molding conditions typically comprising a molding temperature of at least 330° C. and a residence time of at least 10 minutes, more in particular a molding temperature of at least 350° C. and a residence time of at least 15 minutes.

Accordingly the present invention relates to a method for the manufacture of a polycarbonate composition having a Yellowness Index of less than 2.0, said composition comprising i) a polymer component comprising aromatic polycarbonate and ii) a bis(2,4-dicumylphenyl)pentaerythritolbis(2,4-dicumylphenyl)pentaerythritol diphosphite component wherein said bis(2,4-dicumylphenyl)pentaerythritolbis(2,4-dicumylphenyl)pentaerythritol diphosphite component consists of bis(2,4-dicumylphenyl)pentaerythritolbis(2,4-dicumylphenyl)pentaerythritol diphosphite, contaminants and/or degradation products derived from bis(2,4-dicumylphenyl)pentaerythritolbis(2,4-dicumylphenyl)pentaerythritol diphosphite, the method comprising

- providing the polymer component comprising aromatic polycarbonate,
- providing the bis(2,4-dicumyl) pentaerythritol diphosphite component,
- determining the amount of contaminants and/or degradation products derived from bis(2,4-dicumylphenyl)pentaerythritolbis(2,4-dicumylphenyl)pentaerythritol of said bis(2,4-dicumyl) pentaerythritol diphosphite component, and
- provided said bis(2,4-dicumyl) pentaerythritol diphosphite component contains at least 85 wt. % of bis(2,4-dicumylphenyl)pentaerythritolbis(2,4-dicumylphenyl) pentaerythritol diphosphite, combining said polymer component with said bis(2,4-dicumyl) pentaerythritol diphosphite component, wherein the Yellowness Index is determined in accordance with ASTM D1925 measured on a moulded plaque having a thickness of 4 mm and being injection moulded at a maximum temperature of 350° C. and a residence time of 15 minutes.

Preferably the Yellowness Index is at most 1.9, more preferably at most 1.8. The Yellowness Index may be from 1.5 to less than 2.0 such as from 1.5 to 1.9 or 1.6 to 1.9 or 1.7 to 1.9 when measured in accordance with ASTM D1925 on a moulded plaque having a thickness of 4 mm and being injection moulded at a maximum temperature of 350° C. and a residence time of 15 minutes.

DETAILED DESCRIPTION

In the context of the present invention the bis(2,4-dicumylphenyl)pentaerythritol diphosphite component consists of bis(2,4-dicumylphenyl)pentaerythritol diphosphite, contaminants and/or degradation products derived from bis(2,4-dicumylphenyl)pentaerythritol diphosphite. The contaminants may find origin in the manufacturing process that is used for the BPD while the degradation products may originate from either the manufacturing process or any other process or procedure up until the actual use of the material. For example degradation products may be formed during the transport, storage or handling of the BPD. Thus, the total of contaminants, or impurities, and degradation products is that which can be found in the material prior to the BPD and the polymer component being combined. Bis(2,4-dicumyl)pentaerythritol or more precisely bis(2,4-dicumylphenyl)pentaerythritol diphosphite is commercially available from the Doverphos company under the tradename S-9228.

The step of combining the BPD and the polymer component may be done by means known in the art including in particular melt mixing techniques such as extrusion. Thus the BPD and the polymer component may be combined in an extruder such that the BPD is intimately mixed with the polymer component thereby forming the polycarbonate composition. The composition may be extruded through an extrusion die and cut into pellets. In another step the pellets may then be used either as such or mixed with further components to form an article.

The present inventors have found that in order to avoid extensive yellowing of the stabilised polycarbonate the bis(2,4-dicumyl) pentaerythritol diphosphite component is required to contain at least 85, preferably at least 90, more preferably at least 95 wt. % of bis(2,4-dicumylphenyl) pentaerythritol diphosphite. That is, the purity of the BPD should be at least 85, preferably at least 90 more preferably at least 95 wt. %.

The amount of BPD may be from 0.01 to 0.3, preferably from 0.02 to 0.20, more preferably from 0.03-0.15 wt. %. based on the amount of polymer component comprising aromatic polycarbonate. A suitable upper limit may be 0.12 or 0.1 wt. %. Most preferably the amount of BPD is from 250-750 ppm, i.e. from 0.025-0.075 wt. %.

The purity of the BPD can be determined using known analytical techniques such as in particular and preferably gas chromatography (GC) and high performance liquid chromatography (HPLC).

The polycarbonate component of the present invention comprises aromatic polycarbonate. The aromatic polycarbonate is comprised in the polycarbonate component in an amount of at least 80 wt. %, preferably at least 90 wt. %, more preferably at least 95 or 99 wt. %. Most preferably the polycarbonate component essentially consists or consists of aromatic polycarbonate.

The aromatic polycarbonate is preferably bisphenol A polycarbonate, more preferably bisphenol A polycarbonate obtained by means of an interfacial process comprising reacting phosgene and bisphenol A. Such interfacial aromatic polycarbonate is endcapped with one or more of phenol, dicumyl phenol, t-butyl-phenol and preferably p-cumylphenol. The endcap level of such interfacial polycarbonate is typically at least 98, more preferably at least 99%, wherein the endcap level is calculated with the following formula $$\%\ EC = 100 - \left(\frac{ppmOH \times Mn}{340000}\right)$$

wherein % EC is the endcap level, ppmOH is the amount of hydroxyl end groups in parts per million by weight and Mn is the number average molecular weight of the polycarbonate based on polycarbonate standards.

The amount of terminal OH groups can be determined using UV spectroscopy. Combined with the number average molecular weight the endcap level can then calculated. As suitable UV spectrophotometer may be a Perkin Elmer Lambda 800 and measurements may be carried out on 0.01 g of a polycarbonate sample diluted in 10 ml of dichloromethane which is placed into a quartz cuvette of 10 mm of optical path. The wavelength to acquire data are 284 and 292 nm.

The aromatic polycarbonate may also consist or comprise aromatic polycarbonate obtained via the melt-transesterification of a carbonate and bisphenol A. For example the carbonate may be diphenyl carbonate or a di-alkylcarbonate such as dimethyl carbonate and diethylcarbonate. It is well known that melt polycarbonate and interfacial polycarbonates differ in chemical structure in particular in that melt polycarbonate has a certain amount of branching and further has a lower endcap level, both of which are inherent to the melt transesterification process. The endcap level for melt polycarbonate is typically from 70 to 90%, more particularly from 75 to 90%.

The molecular weight of the aromatic polycarbonate may vary and generally is from 15,000 to 60,000 g/mol, preferably 18,000 to 35,000 g/mol when determined by means of gel permeation chromatography (GPC) using polycarbonate standards.

The polycarbonate component may comprise or consist of interfacial aromatic polycarbonate or a mixture of two or more interfacial aromatic polycarbonates.

The polycarbonate component may comprise or consist of melt aromatic polycarbonate or a mixture of two or more melt aromatic polycarbonates.

The polycarbonate component may comprise or consist of a mixture of one or more interfacial aromatic polycarbonates and one or more melt aromatic polycarbonates.

Although the present invention disclosed herein is based on bisphenol A aromatic polycarbonate the aromatic polycarbonate may also comprise or consist of a copolymer of bisphenol A and another bisphenol. In addition to that polysiloxane-polycarbonate (block) copolymers and/or polycarbonate-polyester (block)copolymers may be comprised in the polycarbonate component of the present invention.

It is preferred that the polymer component consists of bisphenol A polycarbonate. More preferably the aromatic polycarbonate is interfacial polycarbonate that is at least partially endcapped with para-cumyl phenol.

The composition of the invention may further comprise an acid stabiliser, preferably selected from one or more of a sulfonic acid, a sulfonic acid ester, an organophosphorous acid or an organophosphorous acid ester. Such stabilisers are suitable in particular when the composition is to be processed under extreme conditions including relatively high temperatures and high residence times.

The acid stabiliser is preferably a sulfonic acid or a sulfonic acid ester, an organophosphorous acid or ester thereof, or a combination comprising at least one of the foregoing, i.e. a combination comprising two or more of the foregoing. A preferred stabiliser is n-butyl tosylate (BuTos).

The sulfonic acid ester can comprise an organosulfonic acid stabilizer of the formula:

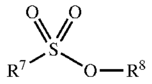

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen $C_{1-24}$ alkyl, or a group of the formula —$S(=O)_2$—$R^7$ wherein $R^7$ is a $C^{6-12}$ aryl or $C^{7-24}$ alkylarylene. The sulfonic acid can comprise an alkylbenzene sulfonic acid, a polystyrene sulfonic acid, or a p-toluene sulfonic acid anhydride. Preferably the acid stabiliser is p-toluene sulfonic acid or butyl p-toluenesulfonate (i.e., n-butyl tosylate). The acid stabiliser is preferably applied in the polymer composition in an amount of from 0.5 ppm to 5 ppm, based on the total weight of the polymer composition.

The organophosphorous acid or ester thereof can include phosphorous acid, phosphoric acid, phosphite, phosphine, phosphonite compound, or a combination comprising at least one of the foregoing. Without willing to be bound to it the present inventors believe that the sulfonic acid or ester thereof, the organophosphorous acid or ester thereof, or a combination comprising at least one of the foregoing contributes to stabilizing an anthraquinone based colorant having at least one hydroxyl group. The present inventors assume that a reaction between the colorant and the polycarbonate is what results in a shift of the absorption spectrum of the colorant and accordingly the transmission properties of the polycarbonate composition.

For the avoidance of doubt it is noted that in the context of the present invention the term acid stabiliser means an acid or an ester of such acid. Other acid derived compounds such as for example salts are not considered as an acid stabiliser and are accordingly excluded from the term "acid stabiliser". More in particular the acid stabiliser is not an alkali or earth alkali metal salt such as an alkali or earth alkali metal salt of a sulfonic or organophosphorous acid.

The step of determining the purity of the BPD is carried out prior to combining the polymer component and the BPD. Both inline as off-line analytical techniques may be used. For example the purity, i.e. the content of bis(2,4-dicumylphenyl)pentaerythritol diphosphite, may be carried out using (high temperature) gas chromatography. Additional analytical techniques may be used to understand the type of contaminants that are present in the material (if any). Such additional techniques include 31P-NMR (Agilent high field supershielded 600 MHZ NMR) wherein BPD is dissolved in d-chloroform/cyclobenzene mixture and hydrolysis products such as mono and di-hydroxy phosphites can be detected. Ion Chromatography may be used to determine phosphite concentration.

Preferably the amount of contaminants and/or degradation products derived from bis(2,4-dicumylphenyl)pentaerythritol includes the measuring of the bis(2,4-dicumylphenyl)pentaerythritol component using high temperature gas chromatography.

Thermoplastic Composition

In another aspect the present invention relates to a method for the manufacture of a thermoplastic composition comprising the manufacture of the polycarbonate composition according the method disclosed herein and combining the so obtained polycarbonate with one or more further polymer components and/or one or more additives.

The present invention is not limited with regards to the further polymer components and accordingly any material known to be used in conjunction with polycarbonate may be used. Accordingly the further polymer component may be any one or more of polysiloxanes, polycarbonate-polysiloxane (block) copolymers, polycarbonate-polyester copolymers, acrylonitrile-butadiene-styrene copolymers, styrene-acrylonitrile copolymers, methyl(meth)acrylate-butadiene-styrene copolymers, poly(ethylene-terephthalate), poly(butylene-terephthalate), polyethylene, polypropylene, ethylene-propylene copolymers, ethylene-acrylic acid copolymers, ethylene-acrylic acid-glycidyl copolymers, polyoxyalkylenes, polymethylmethacrylate and mixtures of any one or more of the foregoing.

Preferably the further polymer component is selected from the group consisting of acrylonitrile-butadiene-styrene copolymers, styrene-acrylonitrile copolymers, methyl(meth)acrylate-butadiene-styrene copolymers and polyesters including polyethylene terephthalate and polybutylene terephthalate.

The additives may be one or more of pigments, dyes, anti-oxidants, mold-release agents, flame retardants, anti-drip agents, organic fillers, inorganic fillers, diffusing agents and UV absorbers. Preferably at least one of the additives consists of tris(2,4-di-tert-butylphenyl)phosphite, which may be present in an amount of from 100-800 ppm, preferably from 250-750 ppm, i.e. from 0.01-0.08 wt. % or 0.025-0.075 wt. % respectively, the weight percent based on the amount of polymer component comprising aromatic polycarbonate.

These thermoplastic compositions can be manufactured using well known techniques such as for example melt mixing techniques, in particular by means of extrusion compounding, i.e. extrusion.

The method for the manufacture of the thermoplastic composition may further comprise melt mixing the components, preferably in an extruder, and pelletising the so obtained thermoplastic composition. These pellets may in turn be used for the manufacture of articles by means of known techniques like for example injection moulding.

It is preferred that the manufacture of a moulded article comprises the manufacture of the polycarbonate composition as disclosed herein or the thermoplastic composition as disclosed herein followed by injection moulding the polycarbonate or thermoplastic composition into an article, wherein the injection moulding is preferably carried out a temperature of at least 350° C. and a residence time of at least 6, preferably at least 15 minutes.

For the avoidance of doubt it is to be understood that the manufacture of the polycarbonate composition and the thermoplastic composition are not required to be carried out inline and/or within the same manufacturing unit. Likewise the manufacture of the molded article is not required to be carried out inline and/or within the same manufacturing unit.

In an aspect the present invention relates to an article obtained or obtainable by the method for the manufacture of a moulded article as disclosed herein.

Controlling

In yet a further aspect the invention disclosed herein relates to a Method of controlling the Yellowness Index of a polycarbonate composition comprising i) a polymer component comprising aromatic polycarbonate and
ii) a bis(2,4-dicumylphenyl)pentaerythritol diphosphite component wherein said bis(2,4-dicumylphenyl)pentaerythritol diphosphite component consists of bis(2,4-dicumylphenyl)pentaerythritol diphosphite, contaminants and/or degradation products derived from bis(2,4-dicumylphenyl)pentaerythritol diphosphite, the method comprising
    providing a bis(2,4-dicumyl) pentaerythritol diphosphite component
    determining the amount of contaminants and/or degradation products derived from bis(2,4-dicumylphenyl)pentaerythritol of said bis(2,4-dicumyl) pentaerythritol diphosphite component, and
provided said bis(2,4-dicumyl) pentaerythritol diphosphite component contains at least 85 wt. % of bis(2,4-dicumylphenyl)pentaerythritol diphosphite, providing a polymer component comprising aromatic polycarbonate and mixing said polymer component with said bis(2,4-dicumyl) pentaerythritol diphosphite component,
wherein the Yellowness Index is determined in accordance with ASTM D1925 measured on a moulded plaque having a thickness of 4 mm and being injection moulded at a maximum temperature of 350° C. and a residence time of 15 minutes.

In yet a further aspect the present invention relates to the use of a bis(2,4-dicumylphenyl)pentaerythritol diphosphite component wherein said bis(2,4-dicumylphenyl)pentaerythritol diphosphite component consists of at least 85 wt. % of bis(2,4-dicumylphenyl)pentaerythritol diphosphite and at most 20 wt. % of contaminants and/or degradation products derived from bis(2,4-dicumylphenyl)pentaerythritol diphosphite, as an additive in an aromatic polycarbonate composition comprising or consisting of bisphenol A polycarbonate for the manufacture of a polycarbonate composition having a Yellowness Index of at most 2.0 determined in accordance with ASTM D1925 measured on a moulded plaque having a thickness of 4 mm and being injection moulded at a maximum temperature of 350° C. and a residence time of 15 minutes.

The present invention will be further elucidated based on the following examples which in no way are intended to limit the invention.

Materials

The following materials were used in the experiments.

| | |
|---|---|
| PC | Linear bisphenol A polycarbonate endcapped with para-cumyl phenol manufactured using an interfacial process. which is and having a weight average molecular weight of about 21800 g/mol (PC standards) and a melt volume rate of about 29.6 cc/ 10 min as measured in accordance with ISO 1133 (300° C., 1.2 kg). |
| AO1 | Tris(2,4-di-tert-butylphenyl)phosphite, commercially available as Irgafos 168. |
| AO2 | Bis(2,4-dicumylphenyl)pentaerythritol diphosphite, commercially available as Doverphos S-9228 |

The table below summarises the experiments that were carried out.

| | E1 | CE1 | E2 | E3 | CE2 | CE3 | CE4 |
|---|---|---|---|---|---|---|---|
| PC [wt. %] | 99.90 | 99.90 | 99.90 | 99.90 | 99.90 | 99.90 | 99.89 |
| AO1 [wt. %] | | | 0.050 | 0.050 | 0.050 | 0.050 | 0.050 |
| AO2 [wt. %] | 0.10 | 0.10 | 0.050 | 0.050 | 0.050 | 0.050 | 0.063 |
| AO2 purity [%] | 95 | 75 | 93 | 86 | 83 | 76 | 76 |
| YI @280° C./6 min | 1.4 | 1.8 | 1.5 | 1.5 | 1.7 | 1.7 | 1.6 |
| YI @350° C./6 min | 1.5 | 1.9 | 1.5 | 1.5 | 1.7 | 1.7 | 1.6 |
| YI @350° C./15 min | 1.9 | 2.4 | 1.7 | 1.9 | 1.9 | 1.9 | 2.0 |

The Yellowness Index (YI) was determined on a 4 mm injection moulded plaque in accordance with ASTM D1925 at the conditions indicated. Thus YI @ 280° C./6 min means the YI measured on a 4 mm plaque moulded at a maximum temperature of 280° C. and a residence time of 6 minutes. The YI after aging, YI_aged, was determined on a 4 mm plaque moulded at a peak temperature of 280° C. and a residence time of 6 minutes and aged for 200 hours at 140° C. under normal atmosphere and pressure.

The purity of the BPD was determined using an Agilent Technologies 7890B (high temperature) GC gas chromatography system equipped with a standard flame ionisation detector.

From the table it can be observed that upon decreasing purity of AO2, which is the BPD, the YI increases, in particular for samples moulded under more abusive conditions. The table also shows that if the BPD is combined with another anti-oxidant that the YI may be lowered. The composition of CE4 contains a higher amount of the low purity BPD such that the total amount of actual bis(2,4-dicumylphenyl)pentaerythritol diphosphite is comparable with the amount in E2. A comparison between CE4 and E2 shows that despite a similar amount of bis(2,4-dicumylphenyl)pentaerythritol diphosphite the YI is lower in case of CE4. This suggests that it is not the reduced amount of bis(2,4-dicumylphenyl)pentaerythritol diphosphite but rather the contaminants cause the reduction in YI.

The invention claimed is:

1. Method for the manufacture of a polycarbonate composition having a Yellowness Index of less than 2.0, said composition comprising i) a polymer component comprising aromatic polycarbonate and ii) a bis(2,4-dicumylphenyl) pentaerythritol diphosphite component wherein said bis(2,4-dicumylphenyl) pentaerythritol diphosphite component consists of bis(2,4-dicumylphenyl) pentaerythritol diphosphite, contaminants and/or degradation products derived from bis(2,4-dicumylphenyl) pentaerythritol diphosphite, the method comprising providing the polymer component comprising aromatic polycarbonate, providing the bis(2,4-dicumyl) pentaerythritol diphosphite component, determining the amount of contaminants and/or degradation products derived from bis(2,4-dicumylphenyl) pentaerythritol of said bis(2,4-dicumyl) pentaerythritol diphosphite component, and provided said bis(2,4-dicumyl) pentaerythritol diphosphite component contains at least 85 wt. % of bis(2,4-dicumylphenyl) pentaerythritol diphosphite, combining said polymer component with said bis(2,4-dicumyl) pentaerythritol diphosphite component, wherein the polycarbonate is interfacial polycarbonate, and wherein the Yellowness Index is determined in accordance with ASTM D1925 measured on a moulded plaque having a thickness of 4 mm and being injection moulded at a maximum temperature of 350° C. and a residence time of 15 minutes.

2. Method of claim 1 wherein the polymer component consists of polycarbonate.

3. Method of claim 1 wherein the polycarbonate is at least partially endcapped with para-cumyl-phenol.

4. Method of claim 1 wherein the composition further comprises an acid stabiliser.

5. Method of claim 1 wherein the step of determining the amount of amount of contaminants and/or degradation products derived from bis(2,4-dicumylphenyl) pentaerythritol includes measuring the bis(2,4-dicumylphenyl) pentaerythritol component using high temperature gas chromatography.

6. Method for the manufacture of a thermoplastic composition comprising the manufacture of the polycarbonate composition according to claim 1 and combining the obtained polycarbonate with one or more further polymer components and/or one or more additives.

7. The method of claim 6 wherein the one or more further polymer components are selected from the group consisting of polysiloxanes, polycarbonate-polysiloxane (block) copolymers, polycarbonate-polyester copolymers, acrylonitrile-butadiene-styrene copolymers, styrene-acrylonitrile copolymers, methyl(meth)acrylate-butadiene-styrene copolymers, polyesters including poly(ethylene-terephthalate) and poly (butylene-terephthalate), polyethylene, polypropylene, ethylene-propylene copolymers, ethylene-acrylic acid copolymers, ethylene-acrylic acid-glycidyl copolymers, polyoxyalkylenes, polymethylmethacrylate and mixtures of two or more of the foregoing and/or the additives are selected from the group consisting of pigments, dyes, anti-oxidants, mold-release agents, flame retardants, anti-drip agents, organic fillers, inorganic fillers, diffusing agents and UV absorbers and mixtures of two or more of the foregoing.

8. The method of claim 6 wherein said additives comprises tris(2,4-di-tert-butylphenyl) phosphite.

9. Method of controlling the Yellowness Index of a polycarbonate composition comprising i) a polymer component comprising aromatic polycarbonate and ii) a bis(2,4-dicumylphenyl) pentaerythritol diphosphite component wherein said bis(2,4-dicumylphenyl) pentaerythritol diphosphite component consists of bis(2,4-dicumylphenyl) pentaerythritol diphosphite, contaminants and/or degradation products derived from bis(2,4-dicumylphenyl) pentaerythritol diphosphite, the method comprising providing a bis(2,4-dicumyl) pentaerythritol diphosphite component determining the amount of contaminants and/or degradation products derived from bis(2,4-dicumylphenyl) pentaerythritol of said bis(2,4-dicumyl) pentaerythritol diphosphite component, and provided said bis(2,4-dicumyl) pentaerythritol diphosphite component contains at least 85 wt. % of bis(2,4-dicumylphenyl) pentaerythritol diphosphite, providing a polymer component comprising aromatic polycarbonate and mixing said polymer component with said bis(2,4-dicumyl) pentaerythritol diphosphite component, wherein the Yellowness Index is determined in accordance with ASTM D1925 measured on a moulded plaque having a thickness of 4 mm and being injection moulded at a maximum temperature of 350° C. and a residence time of 15 minutes.

10. Method for the manufacture of a moulded article comprising the manufacture of the polycarbonate composition of claim 1 and injection moulding the obtained polycarbonate composition into an article.

11. Article obtained or obtainable by the method of claim 10.

12. Method of claim 4, wherein the stabiliser is one or more of a sulfonic acid, a sulfonic acid ester, an organophosphorous acid or an organophosphorous acid ester.

13. Method for the manufacture of a moulded article comprising the manufacture of the thermoplastic composition of claim 6 and injection moulding the obtained polycarbonate composition or thermoplastic composition into an article.

* * * * *